United States Patent
Takeuchi et al.

(10) Patent No.: US 8,341,394 B2
(45) Date of Patent: Dec. 25, 2012

(54) DATA ENCRYPTION/DECRYPTION METHOD AND DATA PROCESSING DEVICE

(75) Inventors: Toshiki Takeuchi, Minato-ku (JP); Hiroyuki Igura, Minato-ku (JP)

(73) Assignee: NEC Corporation, Tokyo (JP)

( * ) Notice: Subject to any disclaimer, the term of this patent is extended or adjusted under 35 U.S.C. 154(b) by 391 days.

(21) Appl. No.: 12/667,156

(22) PCT Filed: Jul. 2, 2008

(86) PCT No.: PCT/JP2008/061991
§ 371 (c)(1),
(2), (4) Date: Dec. 29, 2009

(87) PCT Pub. No.: WO2009/005089
PCT Pub. Date: Jan. 8, 2009

(65) Prior Publication Data
US 2010/0322419 A1    Dec. 23, 2010

(30) Foreign Application Priority Data
Jul. 3, 2007  (JP) ................................. 2007-175072

(51) Int. Cl.
*H04L 29/06* (2006.01)
(52) U.S. Cl. ........................................ 713/151
(58) Field of Classification Search .................. 713/151; 380/255
See application file for complete search history.

(56) References Cited

U.S. PATENT DOCUMENTS

| | | | | |
|---|---|---|---|---|
| 5,161,193 A * | 11/1992 | Lampson et al. | ............. | 713/151 |
| 5,319,712 A * | 6/1994 | Finkelstein et al. | ............ | 380/44 |
| 6,920,562 B1 * | 7/2005 | Kerr et al. | ..................... | 713/189 |
| 7,290,148 B2 * | 10/2007 | Tozawa et al. | ................ | 713/189 |
| 7,385,985 B2 * | 6/2008 | Narsinh et al. | ............. | 370/395.2 |
| 7,453,899 B1 * | 11/2008 | Vaida et al. | .................... | 370/419 |
| 7,461,164 B2 * | 12/2008 | Edwards et al. | ............. | 709/236 |
| 7,512,945 B2 * | 3/2009 | Sydir et al. | ..................... | 718/100 |
| 7,580,358 B2 * | 8/2009 | Fukuoka et al. | ............. | 370/235 |
| 7,698,412 B2 * | 4/2010 | Narsinh et al. | ................ | 709/224 |
| 7,715,437 B2 * | 5/2010 | Denney et al. | ................ | 370/474 |
| 7,805,535 B2 * | 9/2010 | Narsinh et al. | ................ | 709/232 |
| 7,835,398 B2 * | 11/2010 | Denney et al. | ................ | 370/474 |
| 7,991,010 B2 * | 8/2011 | Denney et al. | ................ | 370/474 |
| 8,065,678 B2 * | 11/2011 | Sydir et al. | .................... | 718/100 |
| 2002/0078249 A1 * | 6/2002 | Lu et al. | ........................ | 709/310 |
| 2002/0080818 A1 * | 6/2002 | Zegelin | ......................... | 370/466 |
| 2003/0061623 A1 * | 3/2003 | Denney et al. | ................ | 725/125 |
| 2003/0105830 A1 * | 6/2003 | Pham et al. | .................... | 709/216 |
| 2004/0030815 A1 | 2/2004 | Shimura et al. | | |
| 2004/0059825 A1 * | 3/2004 | Edwards et al. | ............. | 709/230 |
| 2005/0226242 A1 * | 10/2005 | Parker | .......................... | 370/389 |
| 2006/0126841 A1 * | 6/2006 | Pal et al. | ....................... | 380/255 |
| 2006/0136715 A1 * | 6/2006 | Han et al. | ...................... | 713/151 |
| 2008/0130889 A1 * | 6/2008 | Qi et al. | ........................ | 380/257 |
| 2009/0080660 A1 * | 3/2009 | Mo et al. | ...................... | 380/279 |

FOREIGN PATENT DOCUMENTS

JP    04-127210 A    4/1992
(Continued)

*Primary Examiner* — Christian Laforgia
(74) *Attorney, Agent, or Firm* — Sughrue Mion, PLLC

(57) ABSTRACT

It is possible to improve a radio communication digital baseband processing device including data encryption/decryption so as to prevent processing failure caused by a data rate increase in recent years by increasing the MAC processing speed of data encryption/decryption and realizing the load distribution in a processing device. A data processing device which performs a communication process including data encryption/decryption includes: a control processor which performs calculation of the MAC processing parameter; and MAC processing means which performs MAC data processing including data encryption/decryption. The control processor controls the MAC processing means by a command script continuously describing a combination of a command and parameter accompanying it.

8 Claims, 16 Drawing Sheets

FOREIGN PATENT DOCUMENTS

| | | |
|---|---|---|
| JP | 04-140810 A | 5/1992 |
| JP | 04-156495 A | 5/1992 |
| JP | 09-311784 A | 12/1997 |
| JP | 11-505678 A | 5/1999 |
| JP | 2003-501698 A | 1/2003 |
| JP | 2005-167870 A | 6/2005 |
| JP | 2006-238214 A | 9/2006 |
| JP | 2006-238377 A | 9/2006 |
| JP | 2007-074429 A | 3/2007 |
| WO | 03/023602 A1 | 3/2003 |

* cited by examiner

DATA ENCRYPTION/DECRYPTION METHOD AND DATA PROCESSING DEVICE

TECHNICAL FIELD

The present invention relates to an improvement of a radio communication digital baseband processing apparatus including data encryption/decryption processing, in particular, to an increase of MAC processing speed of data encryption/decryption processing and to load distribution in the processing apparatus.

BACKGROUND ART

Layer 2 MAC (Medium Access Control) processing of radio communication digital baseband processing mainly consists of addition/deletion processing of a header part and encryption/decryption processing of a data part. A control processor in an apparatus realizes the MAC processing mainly by software processing while using a part of hardware for encryption/decryption processing. That is, the software processing of the control processor enables flexible coping so that contents of the MAC processing can vary in accordance with situations such as the number of data units in a data stream, bit strength of each data unit, encryption/decryption parameters and the like.

Here, processing of writing data before encryption/decryption processing and reading data after encryption/decryption processing is repeatedly performed for every encryption/decryption processing unit (for example, 64 bits) for the hardware for encryption/decryption processing. However, in future, there is a problem in which the processing load of the control processor is increased accompanied by an increase of bit rates of transmission/reception data in the radio communication and the processing fails when the above method is used to execute MAC processing.

Patent Document 1 (JP-A No. 2006-238214) discloses that a load is distributed to a plurality of sub-processors from a main processor with respect to decryption calculations of encryption data.

FIG. 1 is a view showing an operation that is performed when a main processor load-distributes to sub-processors authentication calculation or decryption calculation of an encryption key in a base station, which is disclosed in the Patent Document 1. The main processor instructs the sub-processors having small load on receiving a calculation request and the sub-processors perform the authentication calculation and the decryption calculation of an encryption key, so that the main processor is released from the processing of calculations.

However, when the above technology is applied to MAC processing, the encryption/decryption processing speed itself is not increased. Thus, the processing may not keep up with any future increase of bit rates. Further, it is not possible to mount the sub-processors on a portable terminal and the like when taking into consideration the area and power consumption.

Patent Document 2 (JP-A No. 11-505678) discloses that there is provided a dedicated integrated circuit module for encryption, so that codec processing and encryption processing of voice data are performed without data transmission by a control processor.

FIG. 2 is a view showing an example in which voice codec processing and encryption/decoding processing according to the prior art are combined into a single integrated circuit module, which is disclosed in the Patent Document 2. Since data transmission is not required between the voice codec processing and the encryption/decoding processing module in the integrated circuit, the overhead of the radio control processor is decreased.

However, if MAC processing is executed via a hardware-module by using the above technology, time to transmit the processing data to a MAC processing module from the control processor is required and it is not possible to input a plurality of data encryption/decryption processing at once (i.e., the control processor should be on standby). Further, if hardware is enabled to realize calculations of relatively complicated MAC processing parameters (encryption/decryption parameter, bit position or the number of bits of a header part or data part and the like), a high-speed and complicated hardware is required.

Patent Document 1 JP-A No. 2006-238214
Patent Document 2 JP-A No. 11-505678

DISCLOSURE OF THE INVENTION

A first problem is that when MAC processing is realized only by using software executed by the control processor, the processing load of the control processor is increased accompanied by a bit rate increase of the transmission/reception data and the processing fails. In particular, when data transmission processing such as reading of data before encryption/decryption processing and writing of data after encryption/decryption processing is performed by software processing, it takes much time to transmit the data.

Additionally, when the dedicated hardware or sub-processor for the entire MAC processing is introduced so as to solve the above problem, as disclosed in the Patent Document 1 or 2, a high speed and complicated hardware or sub-processor is required due to the characteristics of MAC processing, and efficiency is poor from the standpoint of reducing the size and low power consumption.

A second problem is that although there are various MAC processing parameters such as encryption/decryption parameters, the number of blocks of data to be processed, the number of bits in one data unit, bit positions of header part/data part and the like, it is not possible to achieve flexibility in processing that corresponds to each MAC processing operation when a simple hardware or processing means is introduced.

In addition, it is not possible to achieve flexibility as regards MAC processing operations for a plurality of data parts. When it is not possible to achieve flexibility as regards MAC processing operations for a plurality of data parts, the control processor needs repeat the control in a detailed data block unit.

The invention has been made to solve the above problems. An object of the invention is to divide MAC processing of a radio communication process into a part suitable for software processing by a control processor and a part suitable for hardware processing by dedicated hardware and thus to realize optimization and load distribution of the whole MAC processing from standpoints of high speed, area saving and low power consumption.

Another object of the invention is to reduce data transmission by a control processor as much as possible and to reduce data transmission time as much as possible from a standpoint of high speed, to minimize a circuit size or clock frequency of dedicated hardware to be introduced from standpoints of area saving and low power consumption and to cope with MAC processing of various MAC processing parameters and a plurality of data parts from a standpoint of flexibility.

A data processing apparatus that performs a communication process including data encryption/decryption processing according to the invention comprises:

a control processor that performs calculation of a MAC processing parameter; and MAC processing means that performs MAC data processing including data encryption/decryption processing, wherein the control processor controls the MAC processing means by a command script continuously describing a combination of a command and parameter accompanying the command.

The invention provides a data processing method that is performed in a data processing apparatus comprising a control processor that performs calculation of a MAC processing parameter and MAC processing means that performs MAC data processing including data encryption/decryption processing and that performs a communication process including data encryption/decryption processing, wherein the control processor controls the MAC processing means by a command script continuously describing a combination of a command and parameter accompanying the command.

Figure 1:
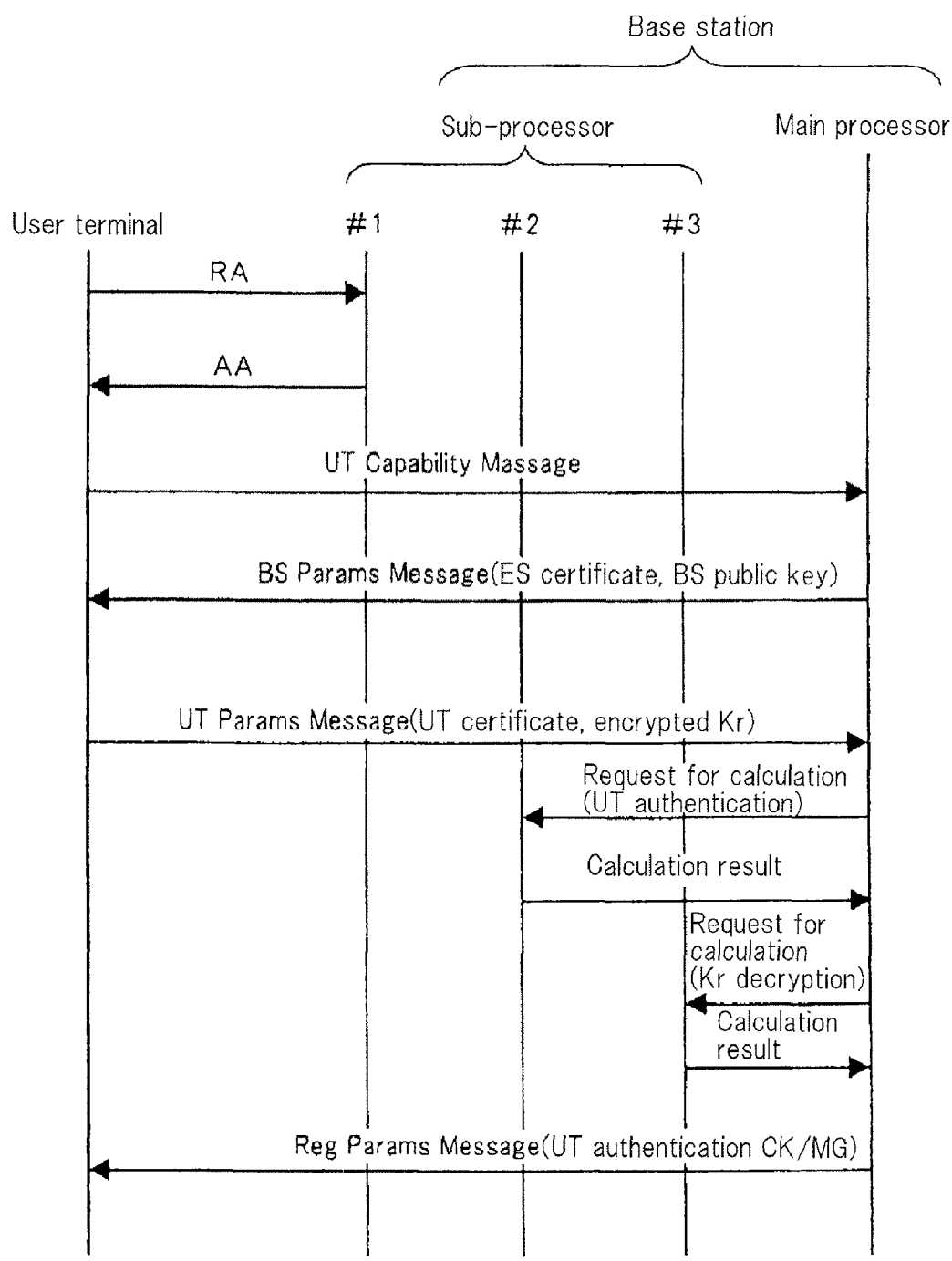
FIG. 1 is a view showing a flow of load-distributing processing to sub-processors.
Figure 2:
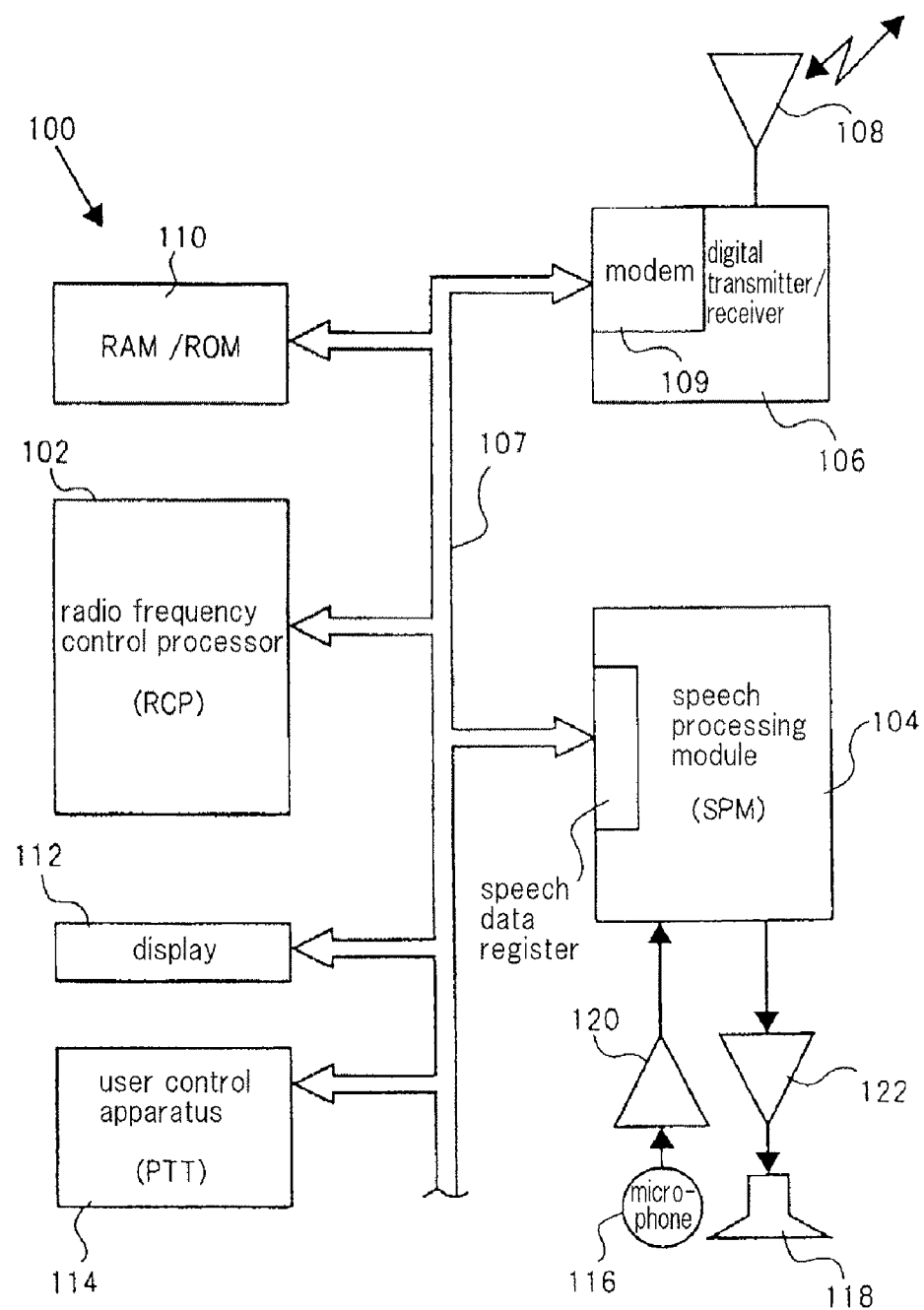
FIG. 2 is a view showing a integrated circuit module of voice codec and encryption processing.

DESCRIPTIONS OF REFERENCE NUMERALS 10 control processor (CPU)
11 interrupt controller (INTC, WINTC)
12 DMA controller (DMAC)
13 external memory controller
14 external memory
20 MAC processing hardware (MAC HW)
21 local memory
22 FIFO controller
23 interpreter
24 stream controller
25 sequencer
26 data input controller
27 encryption/decryption unit
28 data output controller
29 data memory selector
30 DBB (Layer 1) block
31 memory in DBB
40 DBB (digital baseband) core
41 bus
50 data stream
51 original data stream
60 command script

BEST MODE FOR CARRYING OUT THE INVENTION

Next, exemplary embodiments of the invention will be specifically described with reference to FIGS. 3 to 16.

In a first exemplary embodiment, through a case where MAC processing hardware, which is a data processing apparatus of the invention, is mounted on a baseband core unit (Layer 1 processing unit) of a data processing apparatus for radio communication, basic structures, characteristics and operations of the apparatus will be specifically described. Further, in a second exemplary embodiment, an example in which MAC processing hardware is mounted as a peripheral block of a control processor and which can directly access an external memory will be specifically described.

First Exemplary Embodiment

Figure 3:
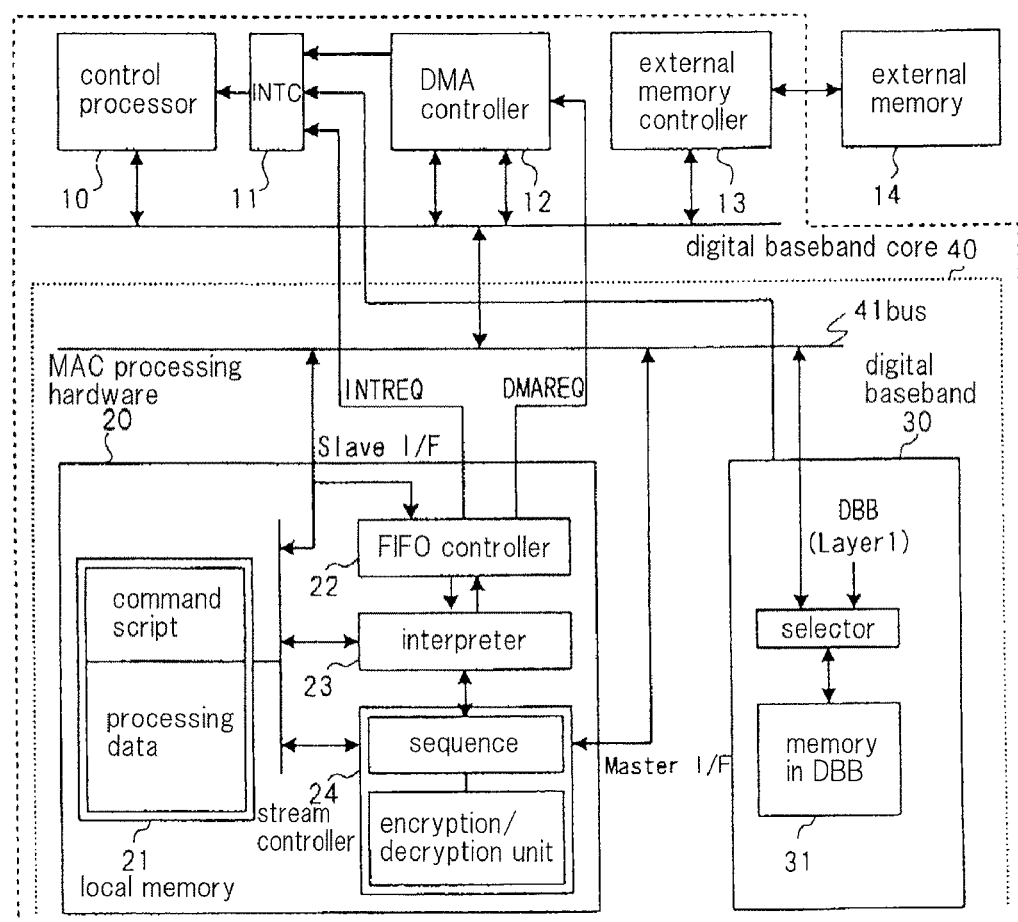
FIG. 3 is a view showing a structure of a data processing apparatus in a first exemplary embodiment of the invention.

FIG. 3 is a view showing the entire structure of a case where MAC processing hardware, which is an example of a data processing apparatus according to a first exemplary embodiment of the invention, is mounted on a baseband core unit (Layer 1 processing unit) of LSI for radio communication. This is an example in which the invention is used to structure a radio communication digital baseband LSI.

In this exemplary embodiment, the LSI for radio communication assumes a basic structure in which control processor (CPU) 10 performs Layer 2 and Layer 3 processing of a radio communication process, and in which as a peripheral block of the processor, interrupt controller (INTC) 11, DMA controller (DMAC) 12, external memory controller 13 and digital baseband core 40 that performs Layer 1 processing of a radio communication process, exist.

Control processor (CPU) 10 or DMA controller 12 accesses to external memory 14 of the LSI outside through external memory controller 13. DMA controller 12 can perform data transmission to external memory 14 from external memory 14, data transmission into digital baseband core 40 from external memory 14 and data transmission to external memory 14 from digital baseband core 40.

In this exemplary embodiment, MAC processing hardware (MAC HW) 20 for accelerating Layer 2 MAC data processing, which is the invention, is mounted in digital baseband core 40 that performs Layer 1 processing of a radio communication process. Accordingly, digital baseband (DBB) 30 that performs Layer 1 processing and MAC processing hardware 20 exist in digital baseband core 40.

MAC processing hardware 20 is connected to control processor 10 or DMA controller 12 through bus 41 and Slave I/F and connected to memory 31 in DBB through dedicated Master I/F. In addition, MAC processing hardware 20 includes local memory 21 that stores command scripts and processing data, which will be described later, FIFO controller 22 that performs FIFO processing for a plurality of processes, interpreter 23 that interprets the command scripts stored in the local memory and stream controller 24 that performs encryption/decryption processing and data transmission processing.

An operation of this exemplary embodiment will be described with reference to FIGS. 3 to 11.

In this exemplary embodiment, during MAC processing, calculation of MAC processing parameters (various encryption/decryption parameters, the number of bits of header part/data part, the number of processing data units and the like), which have relatively complicated specifications and which are not suitable for realization by hardware, is performed at high speed, and high functional control processor (CPU) 10 and MAC data processing (bit shift processing for addition/deletion of header part, encryption/decryption processing, transmission processing of input/output data and the like), which has relatively high regularity and which is suitable for realization by hardware, is accelerated by MAC processing hardware 20.

Figure 4:
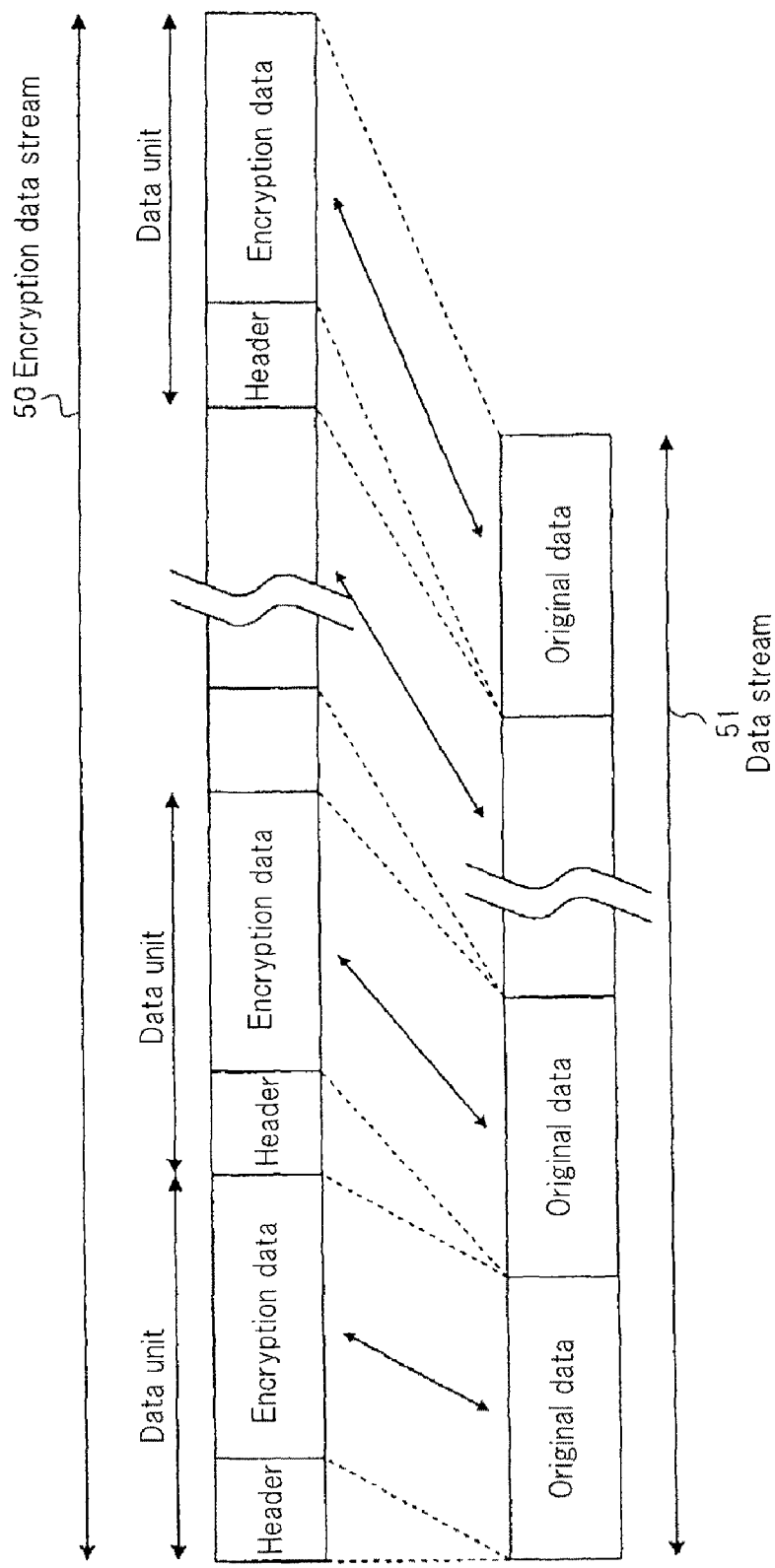
FIG. 4 is a view showing a general example of MAC data processing that is assumed in the invention.

FIG. 4 is a view showing a general example of MAC data processing that is assumed in this exemplary embodiment. For transmission data, the MAC data processing forms a data unit by adding a header part to each data part with regard to original data stream 51, to encrypt the data part, if necessary, and to connect individual data units, thereby generating encryption data stream 50.

However, for reception data, the MAC data processing removes the header part from each data unit with respect to encrypted data stream 50 and decrypts the data part, if necessary, thereby generating original data stream 50. Here, the number of data units in each data stream and the number of bits of the header part and data part in each data unit are arbitrary. Further, in some circumstances, the data part may not be encrypted/decrypted and the addition/deletion of the header part may not be performed.

Control processor 10 shown in FIG. 3 performs the calculation of MAC processing parameters (encryption/decryption parameters, the number of bits of header part/data part in each data unit, and the like) in order to perform MAC data processing shown in FIG. 4, and generates a command script for controlling MAC processing hardware 20 that is an accelerator.

In general, for the transmission data stream, the MAC processing parameter is mainly obtained by an instruction from an upper Layer. For the reception data stream, the MAC processing parameter is obtained by an instruction from an upper Layer and by interpreting each header part of the reception data. In the invention, the calculation for processing the MAC processing parameter is mapped to software processing by control processor 10 because there are many condition branches and the processing is relatively complicated.

MAC processing hardware 20 is used so as to perform the MAC data processing of the transmission/reception data. MAC processing hardware 20 reads out processing data from local memory 21 in MAC processing hardware 20 or memory 31 in DBB, performs encryption/decryption of the data and writes the data after the encryption/decryption into local memory 21 in MAC processing hardware 20 or memory 31 in DBB, in accordance with a command from control processor 10.

(Descriptions of a Control Device of the MAC Processing Hardware)

Figure 5:
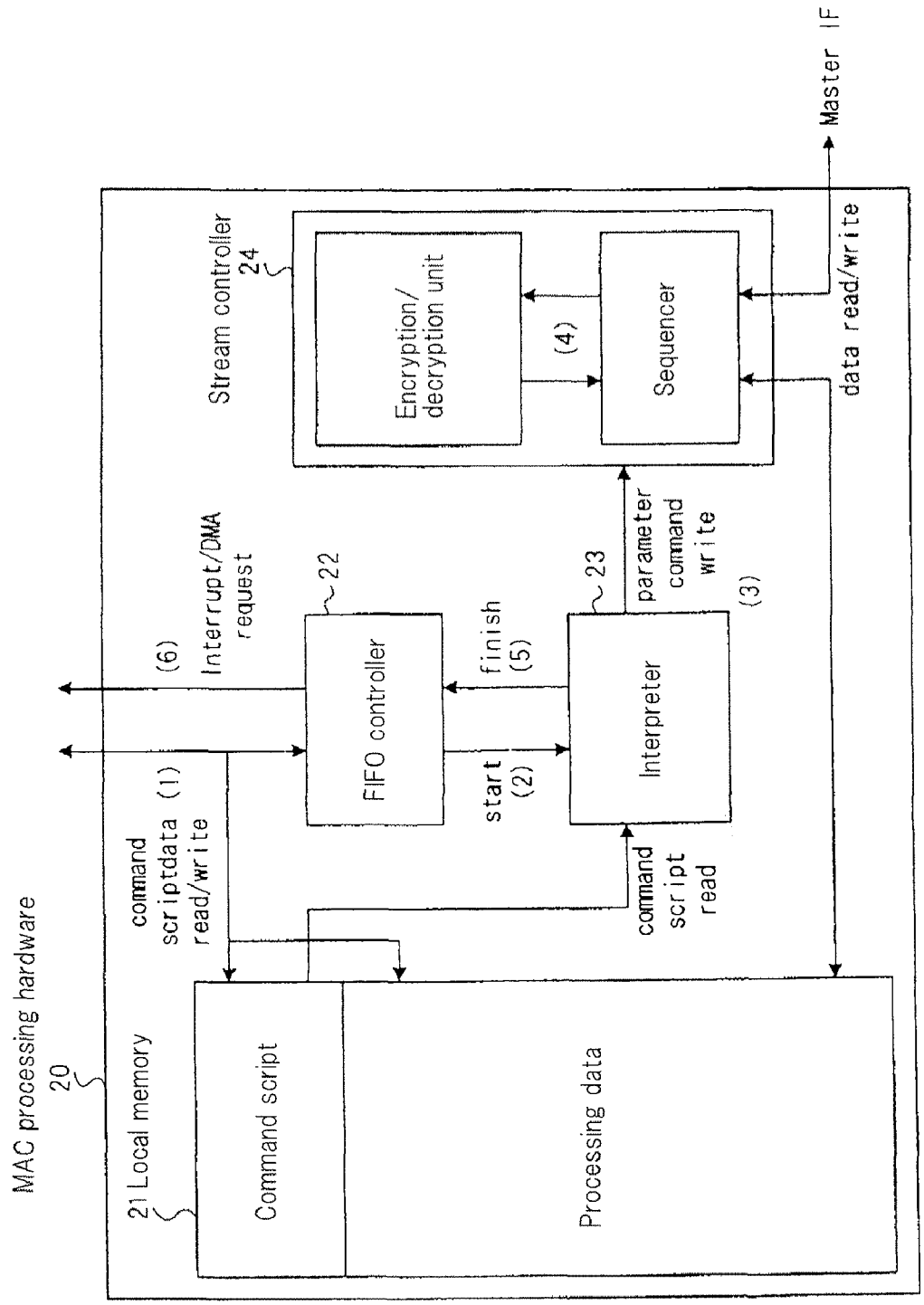
FIG. 5 is a view showing a structure and a control device of MAC processing hardware in the invention.

FIG. 5 is a view showing the internal structure of MAC processing hardware 20 shown in FIG. 3, in which a control device thereof is illustrated in detail.

MAC processing hardware 20 has a FIFO function so as to correspond to inputs of a plurality of processing processes and executes the processes in an inputted order. By providing the FIFO device, control processor 10 can input the next process before another process ends. For example, even when a plurality of MAC data processing such as MAC processing of transmission data and MAC processing of reception data competes, it is possible to execute processing without making control processor 10 enter into a wait state.

An example of a control method of MAC processing hardware 20 is as follows:

(1) First, the control processor 10 sets a command script (which will be specifically described later) at any address of local memory 21, instructs FIFO controller 22 on a leading address of the command script and inputs a process.

(2) When there is no process under execution or when a process under execution is ended, FIFO controller 22 selects, among the processes currently being inputted, a process having highest priority (for example, a process that is inputted earlier than any other process) and instructs interpreter 23 to execute the corresponding process.

(3) Interpreter 23 reads out the corresponding command script from local memory 21, interprets the script and sets a parameter or command to stream controller 24 that actually performs the encryption/decryption processing and the data transmission processing.

(4) Stream controller 24 supplies processing data to the encryption/decryption unit (Cipher/Decipher Core) in accordance with the parameter or command and the encryption/decryption unit performs the encryption/decryption processing.

(5) Interpreter 23 interprets the command scripts in order. When the interpreter executes the final script, it notifies FIFO controller 22 of that processing has ended.

(6) FIFO controller 21 activates the interrupts signal corresponding to the executed script or DMA request signal.

Figure 6:
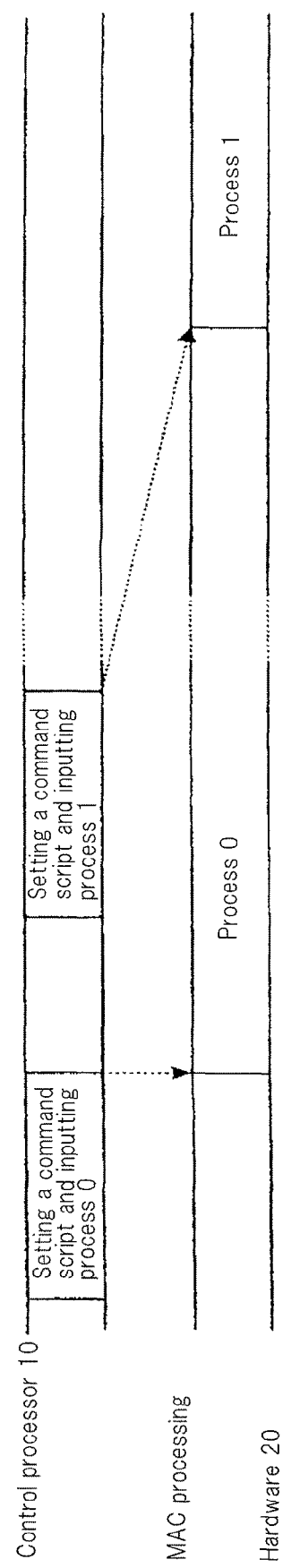
FIG. 6 is a view showing an example of delay execution by FIFO of a MAC processing hardware in the invention.

FIG. 6 is a view showing an example of delay execution by the FIFO operation. In this example, control processor 10 inputs process 0. While MAC processing hardware 20 executes the process, control processor 10 inputs next process 1. In this case, process 1 automatically starts in MAC processing hardware 20 just after process 0 ends. Thereby, control processor 10 doesn't have to wait for the processing end of process 0 to end.

(Descriptions of the Command Script)

In the general MAC processing, there is a high possibility that a plurality of data units will be included in the data stream for every time unit. When control processor 10 issues a command for each data unit and receives an interrupt signal for each data unit, the processing overhead of control processor 10 is increased.

In order to solve the above problem, control processor 10 uses a command script when inputting a process to MAC processing hardware 20. The command script is a kind of program that describes an order of encryption/decryption processing to be executed, encryption/decryption parameters, a leading bit position of processing data, the number of bits and the like. A process can be inputted after continuously describing a plurality of MAC processing following one command script.

In addition, by using the command script, control processor 10 can input to MAC processing hardware 20 a variety of MAC data processing such as ((header part transmission processing+data part encryption processing)×(the number of data units). Furthermore, it is possible to reduce the number of interrupt signal inputs to control processor 10 and to reduce the interrupt processing overhead of control processor 10.

Figure 7:
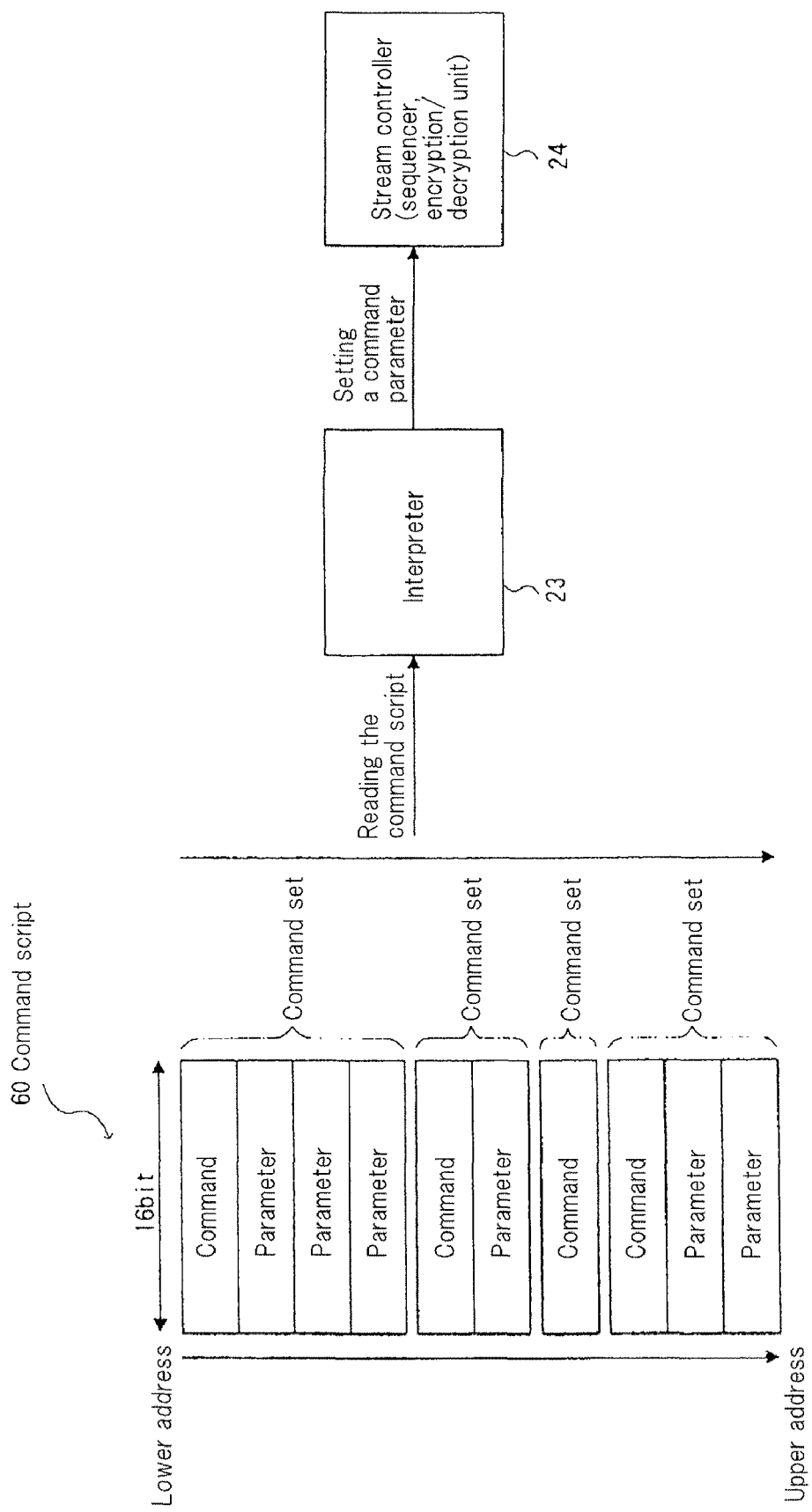
FIG. 7 is a view showing a basic structure of a command script in the invention.

FIG. 7 is a view showing an example of a basic structure of a command script. Command script 60 is realized by arranging and describing a command and parameter accompanying it, for example. Both the command and the parameter are expressed by one half word (16 bits), for example, and the number of parameters to be combined with the commands are different in accordance with the commands.

For example, when performing any encryption/decryption processing, all parameters (memory selection of a source to be read and a destination to be written, a leading address and a leading bit position of data, bit format of memory, bit length of data to be processed, various encryption/decryption processing parameters and the like) for the corresponding encryption/decryption processing are first set by encryption/decryption processing parameter setting commands and execution of encryption/decryption processing is started by an encryption/decryption processing executing command. When the execution ends, processing of the command script is ended by an ending command.

Here, as shown in FIG. 4, a plurality of data units exists in the data stream for which the MAC data processing is performed, the header part and the data part further exist in each data unit and the bit lengths of the header part and the data part or the encryption/decryption processing parameters of the data part may be changed for every data unit.

Since the command script is realized by a combination of a command and a parameter accompanying it in this exemplary embodiment, it is the most suitable structure for processing the MAC processing data streams. For example, for the MAC data processing of transmission data, it is possible to process any MAC processing data stream, in which a parameter or bit length is changed on the way, with one command script by repeatedly describing a header part transmission parameter setting command, a header part transmission executing command, a data part encryption parameter setting command, a data part encryption executing command and the like as much as the number of data units.

In addition, it is not a problem to define an individual setting command capable of changing only a partial parameter in the setting command, in addition to a command to set all parameters for encryption/decryption processing. However, since the structure of the command script shown in FIG. 7 is an example, it doesn't matter that a command and a parameter are not expressed by codes of one half word (16 bits). In addition, the interpretation of the command script is performed by interpreter 23. Interpreter 23 interprets the command scripts and sequentially operates stream controller 24 including the encryption/decryption unit. Interpreter 23 is realized by a simple processor or hardware such as DSP having a function limited.

(Descriptions of Structure and Operation of Stream Controller 24)

Figure 8:
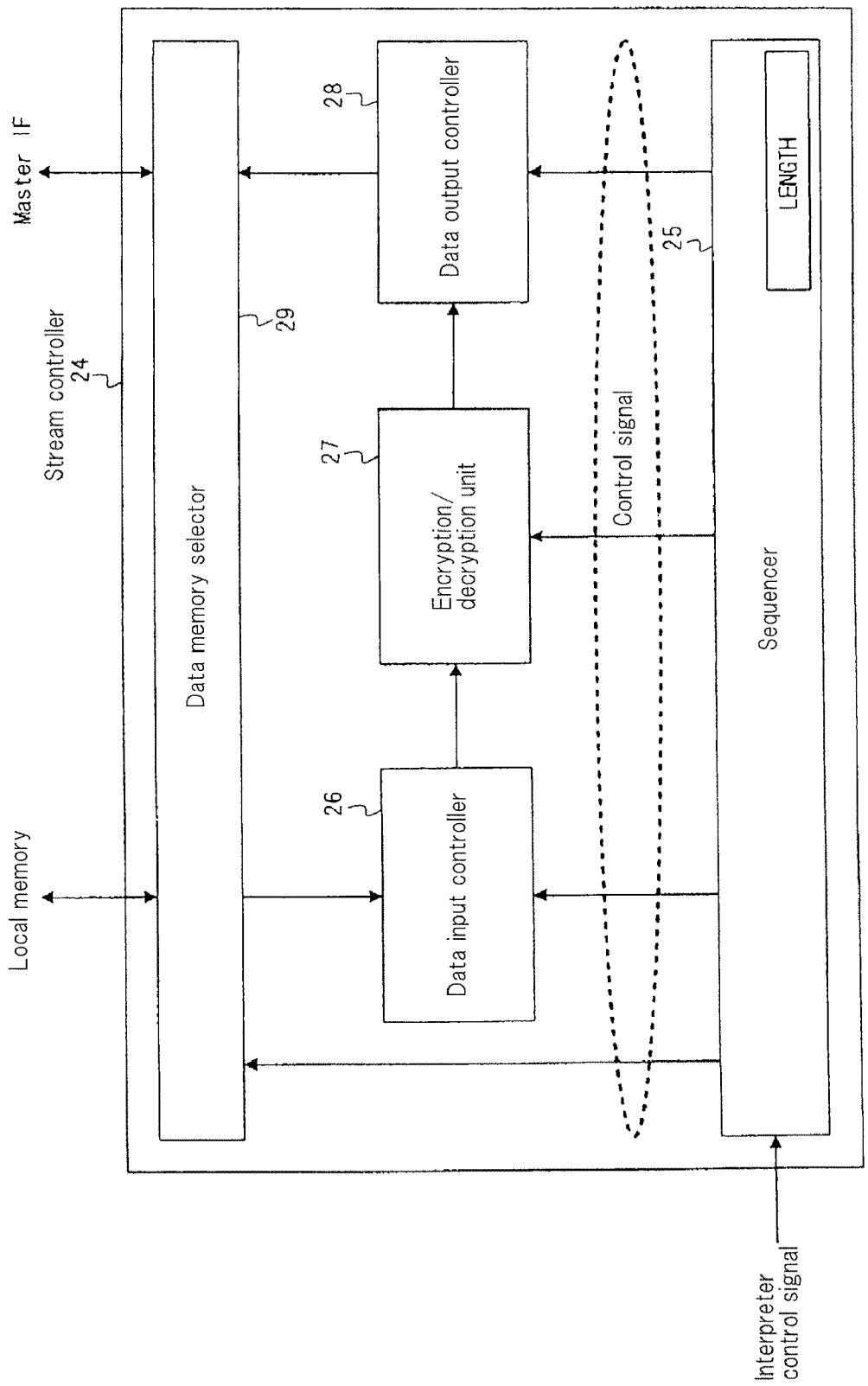
FIG. 8 is a view showing an internal structure of a stream controller in the invention.

FIG. 8 is a view showing an internal structure of stream controller 24 that performs data encryption/decryption processing and data transmission processing in MAC processing hardware 20.

Stream controller 24 has a parameter resister that is controller by interpreter 23 and comprises sequencer 25 that manages a sequence of the MAC data processing (entire stream controller) while managing a processing bit length (LENGTH), data input controller 26 that autonomously performs input processing of the processing data for every encryption/decryption unit (for example, 64 bits) while performing bit shift or bit/byte swap, encryption/decryption unit 27 that performs encryption/decryption processing for every encryption/decryption unit, data output controller 28 that autonomously performs output processing of data after processing every encryption/decryption unit while performing bit shift or bit/byte swap, and data memory selector (bus selector) 29 that selects from the local memory and external memory (memory in DBB) a source from which input data is read out and a destination to which output data is written.

In order to cope with a case where the encryption/decryption processing is unnecessary such as transmission of a header part, encryption/decryption unit 27 has a function of transmitting the processing data from input data controller 26 to data output controller 28 as is. By the command or parameter of the command script, it is possible to select whether or not to execute which encryption/decryption processing or whether or not to transmit the processing data, as is, without encryption/decryption.

Figure 9:
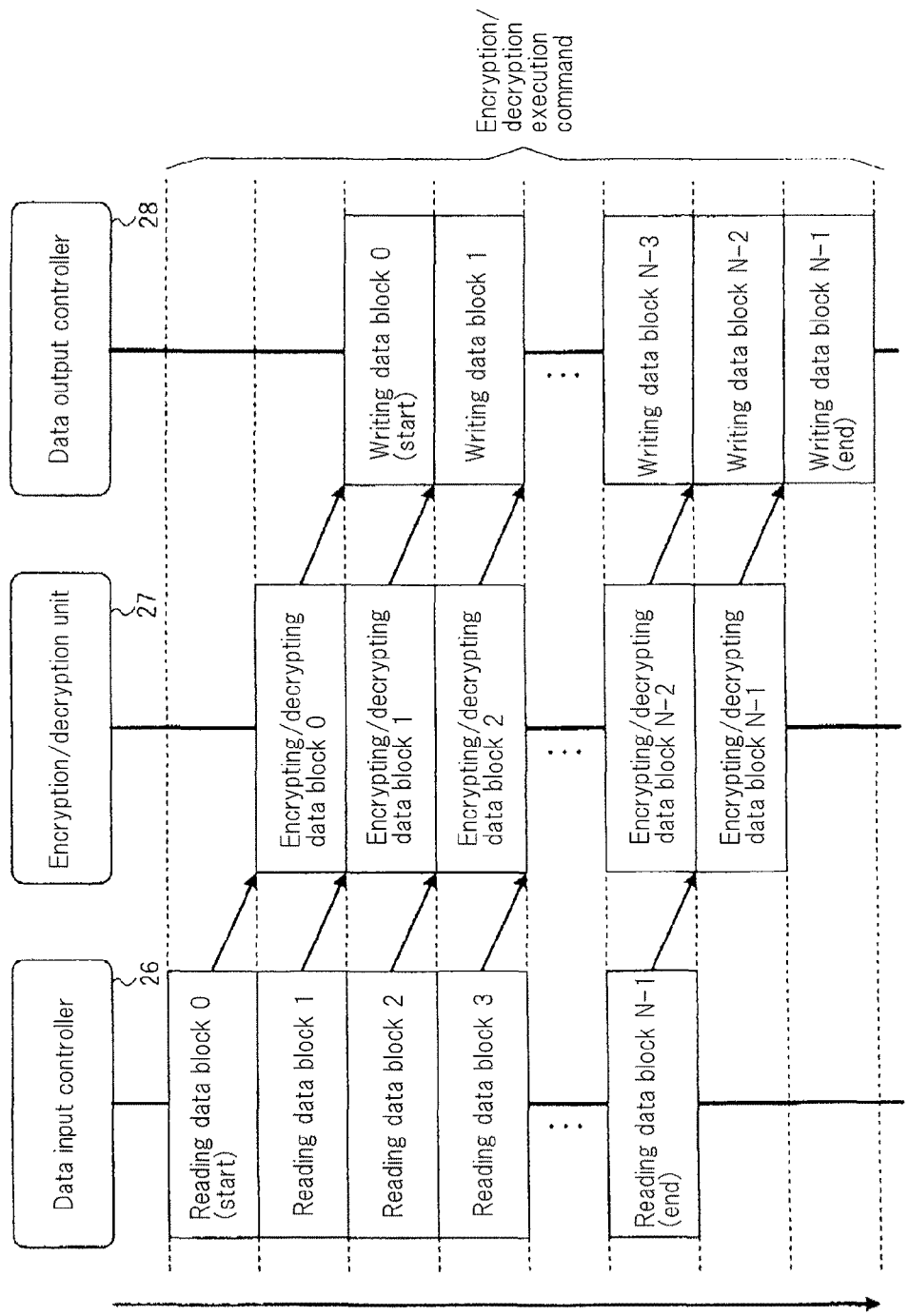
FIG. 9 is a view showing pipeline processing of a stream controller in the invention.

FIG. 9 is a view showing an operation of stream controller 24, which shows pipeline processing of input processing of the processing data, encryption/decryption processing, and output processing of the data after processing.

As shown in FIG. 9, it is possible to cover up most of input/output data transmission time, which is a processing throughput, by performing pipeline processing for encryption/decryption unit of transmission processing of input data in data input controller 26, data encryption/decryption processing by encryption/decryption unit 27, and the output processing of output data by data output controller 28.

Sequencer 25 in the stream controller manages the pipeline processing. For example, for every encryption/decryption processing unit, the sequencer enables data input controller 26, encryption/decryption unit 27 and data output controller 28 to start the necessary processing and updates the processing bit length and starts processing of the next pipeline stage when BUSY of all blocks corresponding to 1 pipeline stage is released. By repeating the above processing until the processing bit lengths are provided by the parameter, the MAC data processing corresponding to 1 execution command is realized.

(Descriptions of Bit Shift Processing and Swap Processing of Input/Output Data)

In encryption/decryption processing, the bit stream processing is performed in an encryption/decryption processing block unit of 64 bits, for example. However, when the data is stored in memory, the boundary of an address unit of the memory is not always consistent with the boundary of a block unit of encryption/decryption processing. Thus, it is necessary to transmit the data while performing bit shift processing.

In this exemplary embodiment, bit shift processing is realized in data input controller 24 and data output controller 28 in stream controller 24 and the bit shift amount of the memory of a source to be read and the bit shift amount of the memory of a destination to be written can be independently designated in the command script.

In addition, local memory 21 and external memory 14, which are used to reserve the bit stream, and memory 31 in DBB can transmit the data in a unit of 8 bits, 16 bits, 32 bits or 64 bits. However, each bit format is made to be different from the bit format of the encryption/decryption processing data stream (bit sequence of the bit stream) by a data transmission unit (8 bits, 16 bits, 32 bits, 64 bits), an endian (little endian or big endian), a bit direction (MSB-first, LSB-first) and the like.

In this exemplary embodiment, it is possible to designate bit formats of a memory of a source to be read and a memory of a destination to be written by the command script. For example, it is possible to designate the bit formats by combining bit swap, byte swap, half word swap and the like and the swap processing is also realized with hardware by data input controller 26 and data output controller 28.

Figure 10:
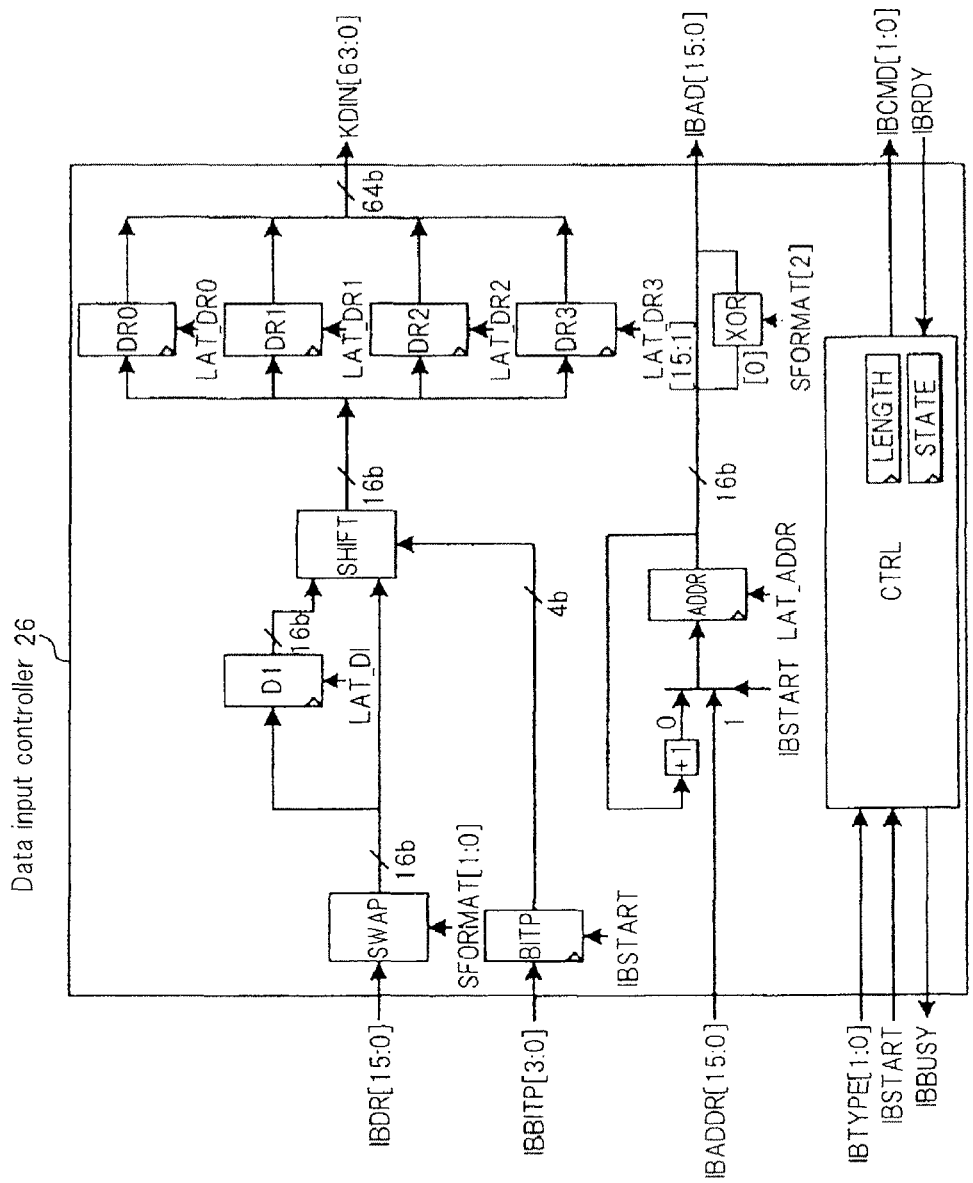
FIG. 10 is a view showing a circuit structure of a data input controller in the invention.
Figure 11:
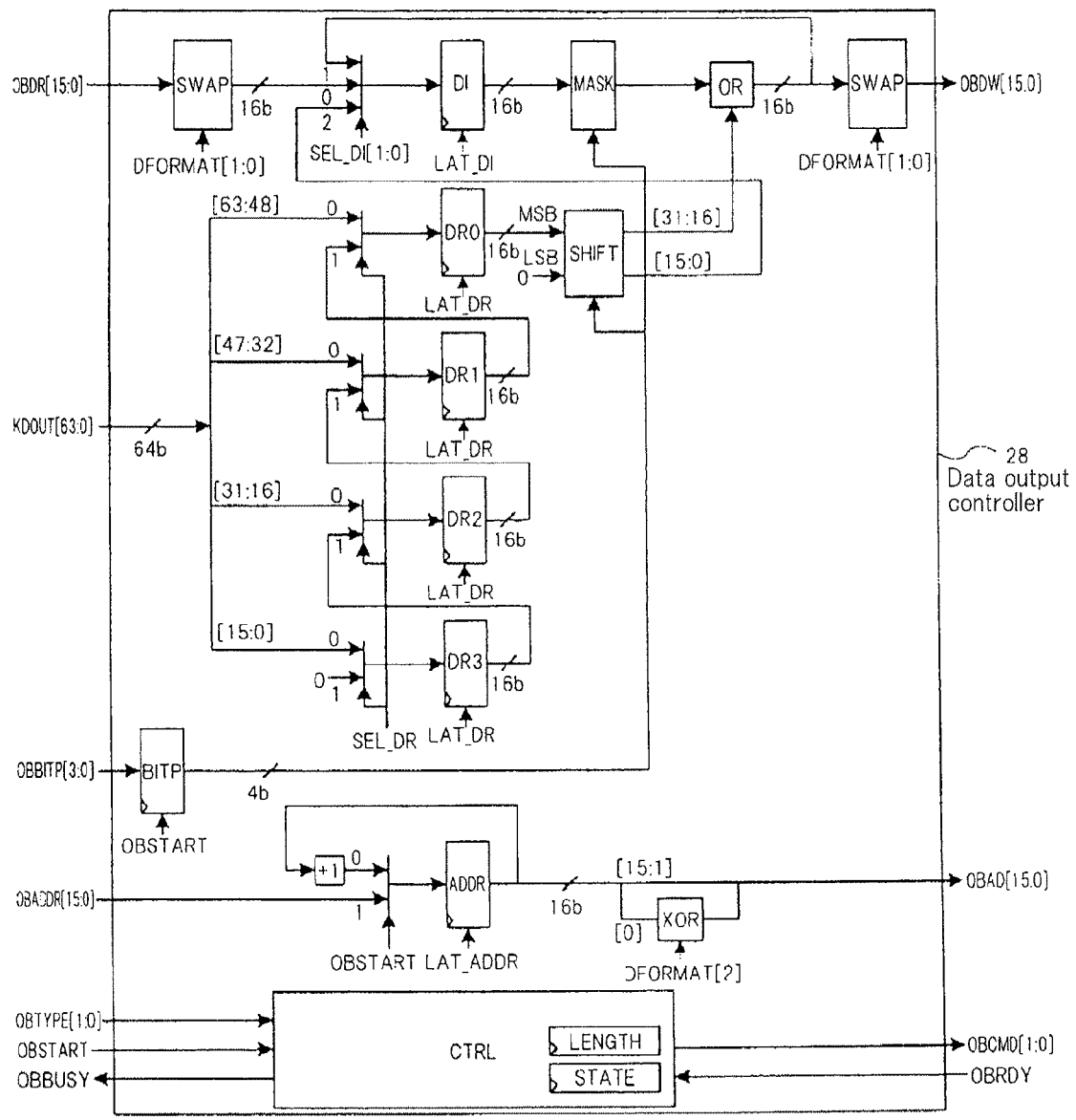
FIG. 11 is a view showing a circuit structure of a data output controller in the invention.

FIGS. 10 and 11 show an example of a structure of an internal circuit of data input controller 26 and data output controller 28, respectively.

The data input controller shown in FIG. 10 has a circuit structure described as follows. It performs desired swap processing (SWAP) for the processing data that is read in accordance with the bit format (FORMAT) of the memory of a source to be read, thereby correctly arranging the bit sequence. After that, the controller executes a desired bit shift (SHIFT) in accordance with the leading bit position (BITP). By performing such operations, the controller structures and transmits necessary encryption/decryption processing unit blocks to the encryption/decryption core.

Here, the bit for which the reading has been performed and which does not enter the encryption/decryption processing unit block is reused in a next pipeline stage. Thus, the bit is left in the register (DI) just as it is stored. Thereby, it is possible to prevent reading access to the same memory address from being performed many times.

Additionally, the data output controller shown in FIG. 11 has a circuit structure described as follows. First, for data results corresponding to the encryption/decryption processing unit block inputted from the encryption/decryption core, the controller performs desired bit shift (SHIFT) in accordance with the leading bit position (BITP), thereby adjusting the bit position in the bit stream. After that, the controller updates only a bit part for which re-writing is performed (MASK, OR) and then performs desired swap processing (SWAP) in accordance with the bit format (FORMAT) of a memory of a destination to be written, thereby transmitting the output data.

Here, the controller initially performs reading of the memory address of a destination to be written, which corresponds to the leading bit of the bit stream, stores the bit part that should not be overlap-written in the register (DI) and then transmits the output data. In addition, for one stage except the final pipeline stage for the corresponding bit stream, the controller stores the data in the register (DI) without transmitting the output data to a memory address having a possibility that a bit may be re-written in the next pipeline stage, connects the bits in the next pipeline stage and then performs data writing and transmission.

By performing the above operations, reading access to the address in the middle of the bit stream becomes unnecessary and it is possible to prevent the writing access to the same memory address from being performed many times.

By realizing the data input/output controllers with the circuit structures as described above, it is possible to designate the bit length of a header part to be added/deleted or the bit length of a data part to be encrypted/decrypted in one bit unit. In addition, by realizing various bit processing with the combination circuit in the data transmission processing circuit, it is possible to realize any bit processing (shift, swap and the like) without cycle overhead in the data input cycle and data output cycle.

Exemplary Embodiment 1

Figure 12:
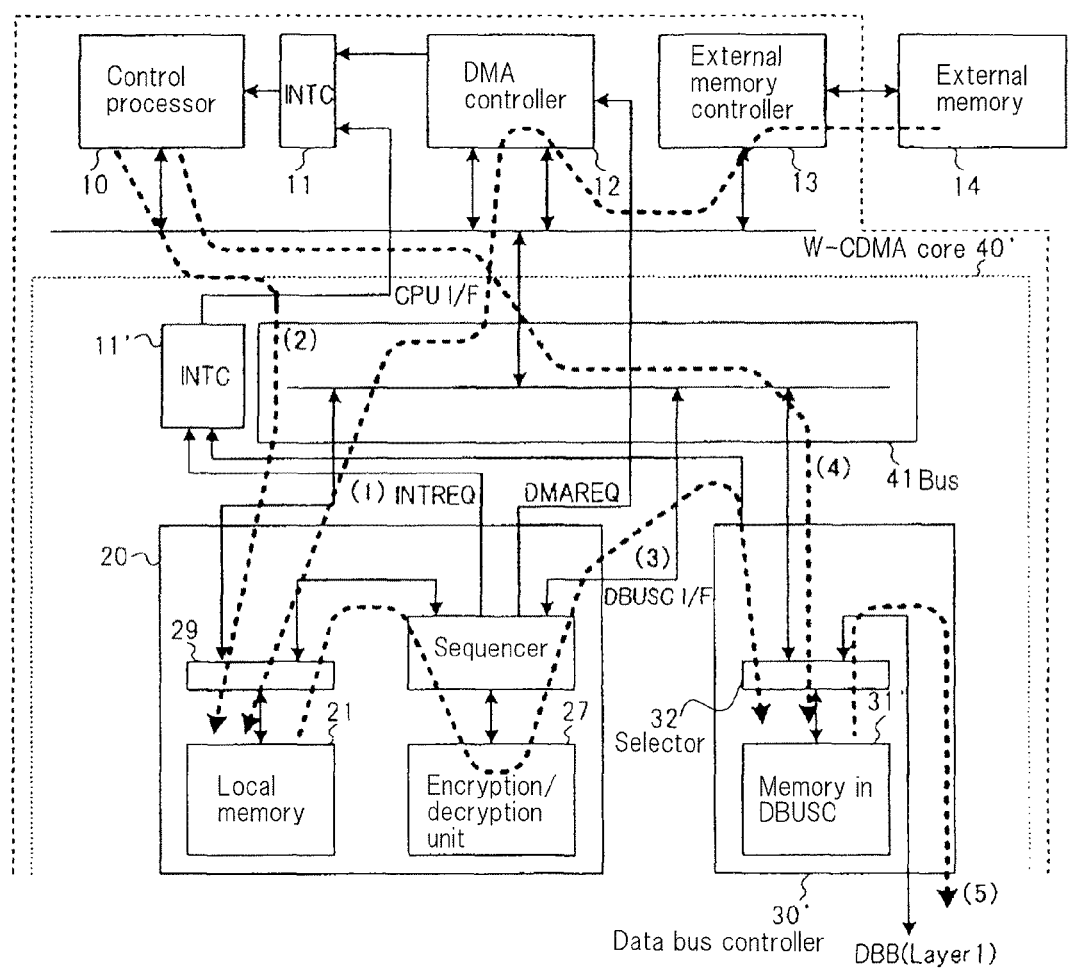
FIG. 12 is a view showing an encryption processing sequence of transmission data in an exemplary embodiment 1 of the invention.
Figure 13:
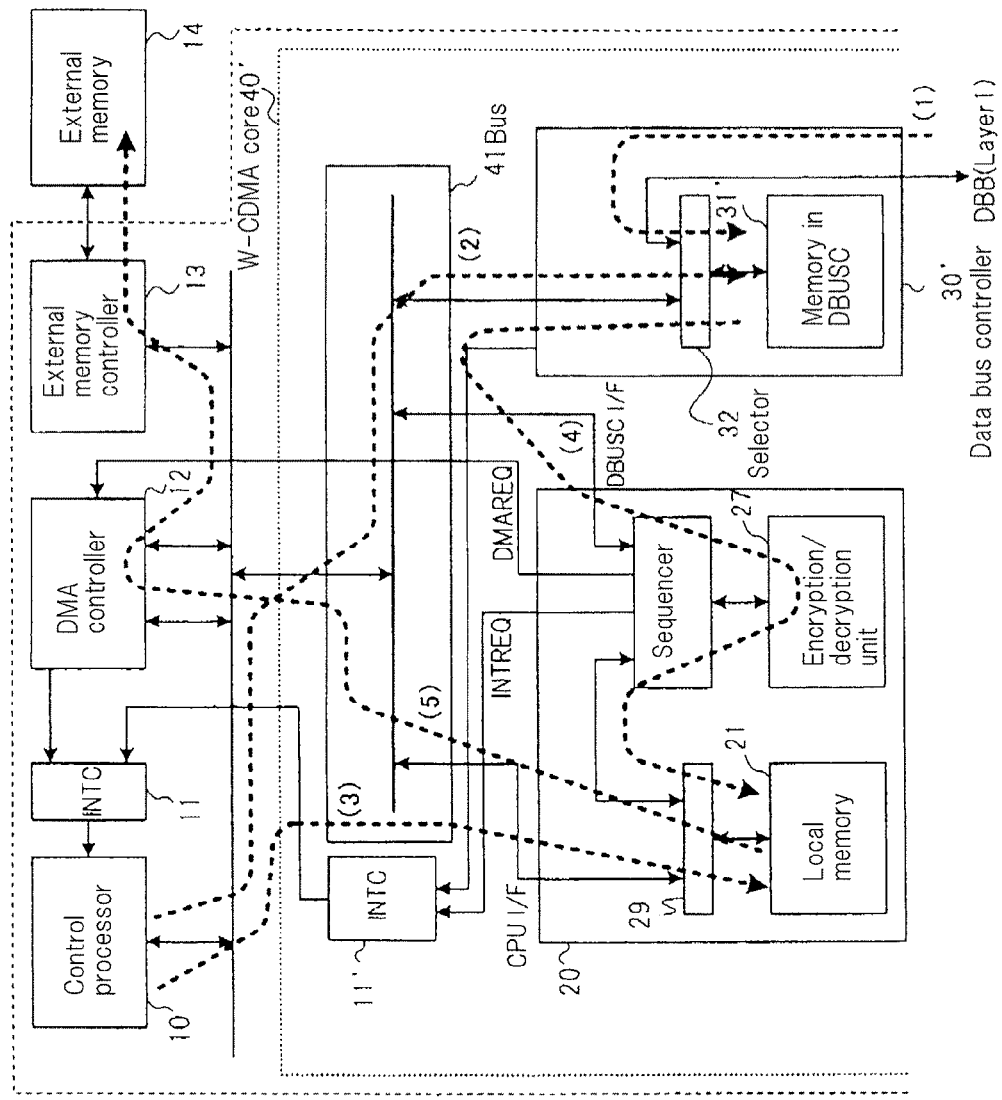
FIG. 13 is a view showing a decryption processing sequence of reception data in an exemplary embodiment 1 of the invention.
Figure 14:
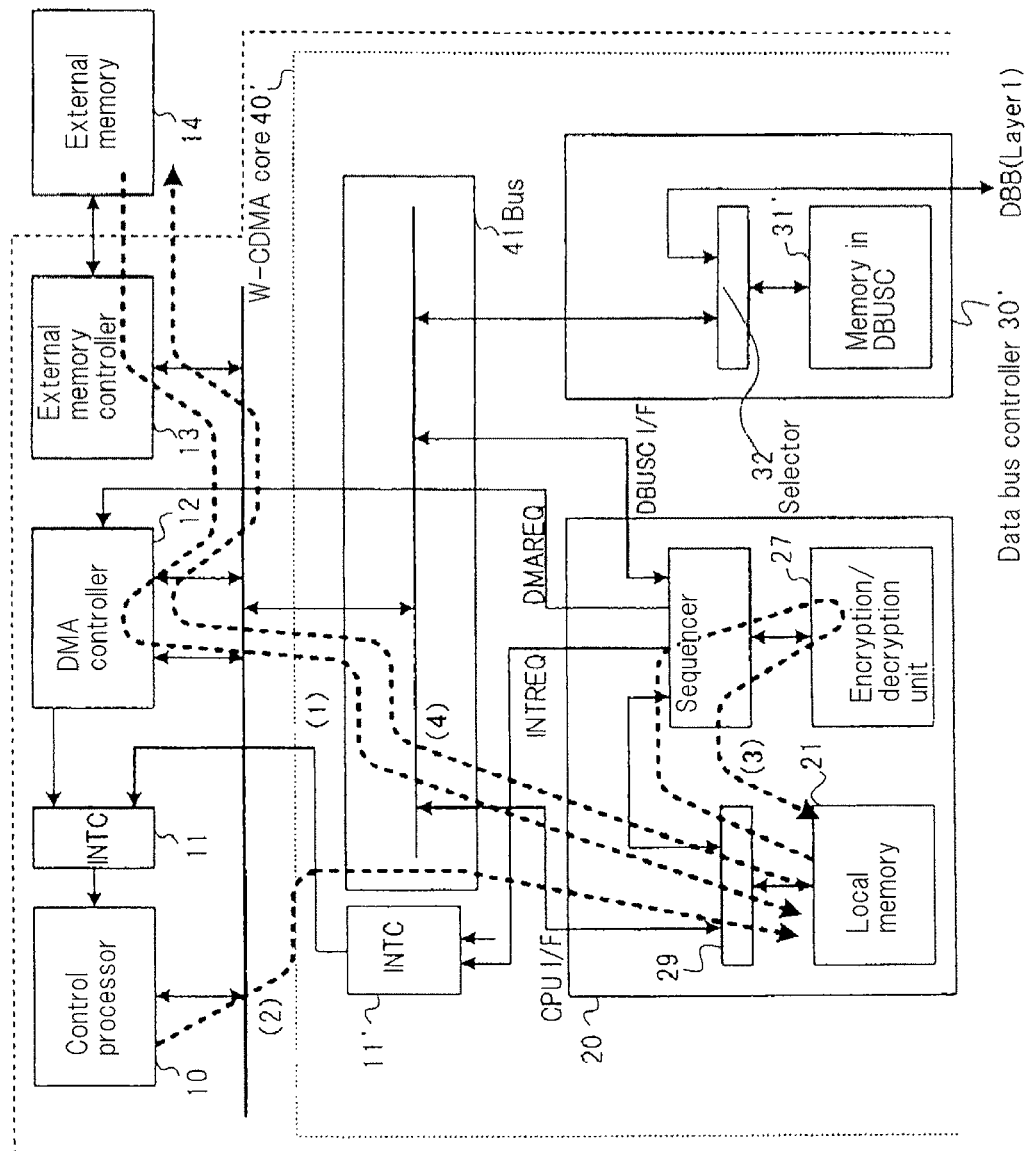
FIG. 14 is a view showing an encryption/decryption processing sequence of processing data in an exemplary embodiment 1 of the invention.

FIGS. 12 to 14 show an example in which the first exemplary embodiment is applied to a W-CDMA digital baseband LSI system that is a specific example of a radio communication baseband processing apparatus.

In exemplary embodiment 1, the W-CDMA digital baseband LSI comprises control processor (CPU) 10 that performs Layer 2 processing and Layer 3 processing of a W-CDMA communication process, and as a peripheral block of the processor, interrupt controller (INTC) 11, DMA controller (DMAC) 12, external memory controller 13 and W-CDMA core 40' that performs Layer 1 processing of the W-CDMA communication process.

Control processor 10 and DMA controller 12 can access external memory 14 of the LSI from the outside through external memory controller 13. In addition, MAC processing hardware 20 for accelerating Layer 2 MAC data processing is mounted in W-CDMA core 40'. Although MAC processing hardware 20 is basically same as that shown in FIG. 3, it corresponds to KASUMI algorithm for W-CDMA processing (KASUMI f8, KASUMI f9, GEA 3 for GSM/GPRS/EDGE processing and the like) as the encryption/decryption processing. MAC processing hardware 20 is connected to control processor 10 or DMA controller 12 through bus 41 and Slave I/F and is connected to memory 31' in DBUSC (Data-Bus Controller) in data bus controller 30' through dedicated DBUSC I/F and selector 32.

FIG. 12 shows a sequence of transmitting transmission data existing on external memory 14 to a transmission processing core in DBB (Layer 1) block while encrypting the data with MAC processing hardware 20.

(1) Transmission data before encryption, which is reserved in external memory 14, is transmitted to local memory 21 in MAC processing hardware 20 by using DMA controller 12. When the transmission ends, an interrupt is generated for control processor 10.

(2) Control processor 10 sets, as a command script, information of a command and a parameter for encryption in MAC processing hardware 20 and starts MAC processing hardware 20.

(3) MAC processing hardware 20 reads out the transmission data from local memory 21 in MAC processing hardware 20, performs encryption (KASUMI f8) processing and header addition processing, if necessary, and writes a result thereof into memory 31' in DBUSC. When the encryption processing ends, MAC processing hardware 20 interrupts control processor 10.

(4) Control processor 10 additionally adds header information and the like to the encrypted transmission data transmitted to memory 31' in DBUSC, if necessary, and starts data bus controller 30'.

(5) Data bus controller 30' transmits the encrypted transmission data to a transmission processing core in digital baseband unit 30 through a data bus provided between digital baseband unit 30 shown in FIG. 3 and the data bus controller.

FIG. 13 shows a sequence of transmitting to external memory 14 reception data transmitted from a reception processing core in the DBB (Layer 1) block while decrypting the data with MAC processing hardware 20.

(1) Reception data that has been decoded by a reception processing core of the DBB (Layer 1) block is transmitted to memory 31' in DBUSC through a data bus. When the transmission ends, an interrupt is generated for control processor 10.

(2) When control processor 10 is started by the interrupt, control processor 10 accesses memory 31' in DBUSC and interprets a header of the reception data.

(3) Control processor 10 sets, as a command script, parameter information resulting from the header interpretation in MAC processing hardware 20 and starts MAC processing hardware 20. At the same time, the control processor performs a setting for DMA controller 12.

(4) MAC processing hardware 20 reads out the reception data from memory 31' in DBUSC, performs decryption (KASUMI f8) processing, and header deletion processing, if necessary, and writes the result thereof into local memory 21 in MAC processing hardware 20. When the decryption processing ends, a DMAREQ signal becomes active.

(5) When the DMAREQ signal becomes active, DMA controller 12 reads out the decrypted reception data from local memory 21 in MAC processing hardware 20 and transmits it to external memory 14. When the transmission ends, DMA controller 12 interrupts control processor 10.

FIG. 14 shows a sequence of encrypting or decrypting the transmission/reception data existing in external memory 14 with MAC processing hardware 20 and again transmitting it to external memory 14.

(1) The data for encryption/decryption processing, which is reserved in external memory 14, is transmitted to local memory 21 in MAC processing hardware 20 by using DMA controller 12. When the transmission ends, an interrupt is generated for control processor 10.

(2) Control processor 10 sets, as a command script, parameter information for encryption/decryption processing in MAC processing hardware 20 and starts MAC processing hardware 20. At the same time, the control processor performs a setting for DMA controller 12.

(3) MAC processing hardware 20 reads out processing source data from the memory in MAC processing hardware 20, performs the set description/decryption processing, and writes the result thereof into the memory in MAC processing hardware 20. When the encryption/decryption processing ends, a DMAREQ signal becomes active.

(4) When the DMAREQ signal becomes active, DMA controller 12 reads out the encrypted/decrypted data from local memory 21 in MAC processing hardware 20 and transmits it to external memory 14. When the transmission ends, DMA controller 12 interrupts control processor 10.

As shown in FIGS. 12 to 14, in the encryption/decryption processing and data transmission processing of the transmission/reception data between external memory 14 and DBB (Layer 1) block 30, control processor 10 mainly performs the generation and setting of a command script for controlling MAC processing hardware 20 and the setting of DMA controller 12. In other words, since it is not necessary for the control processor itself to perform the data transmission, the processing load is decreased and the load distribution for the processing can be made.

In addition, MAC processing hardware 20 performs the pipeline processing of input/output data transmission and encryption/decryption processing, and the bit processing without cycle overhead, so that the MAC processing speed can be increased.

(Low Power Consumption by a Clock Control Device)

In MAC processing hardware 20 of exemplary embodiment 1, a clock control device is mounted so that clocks are not supplied to an internal block not being used as much as possible.

Figure 15:
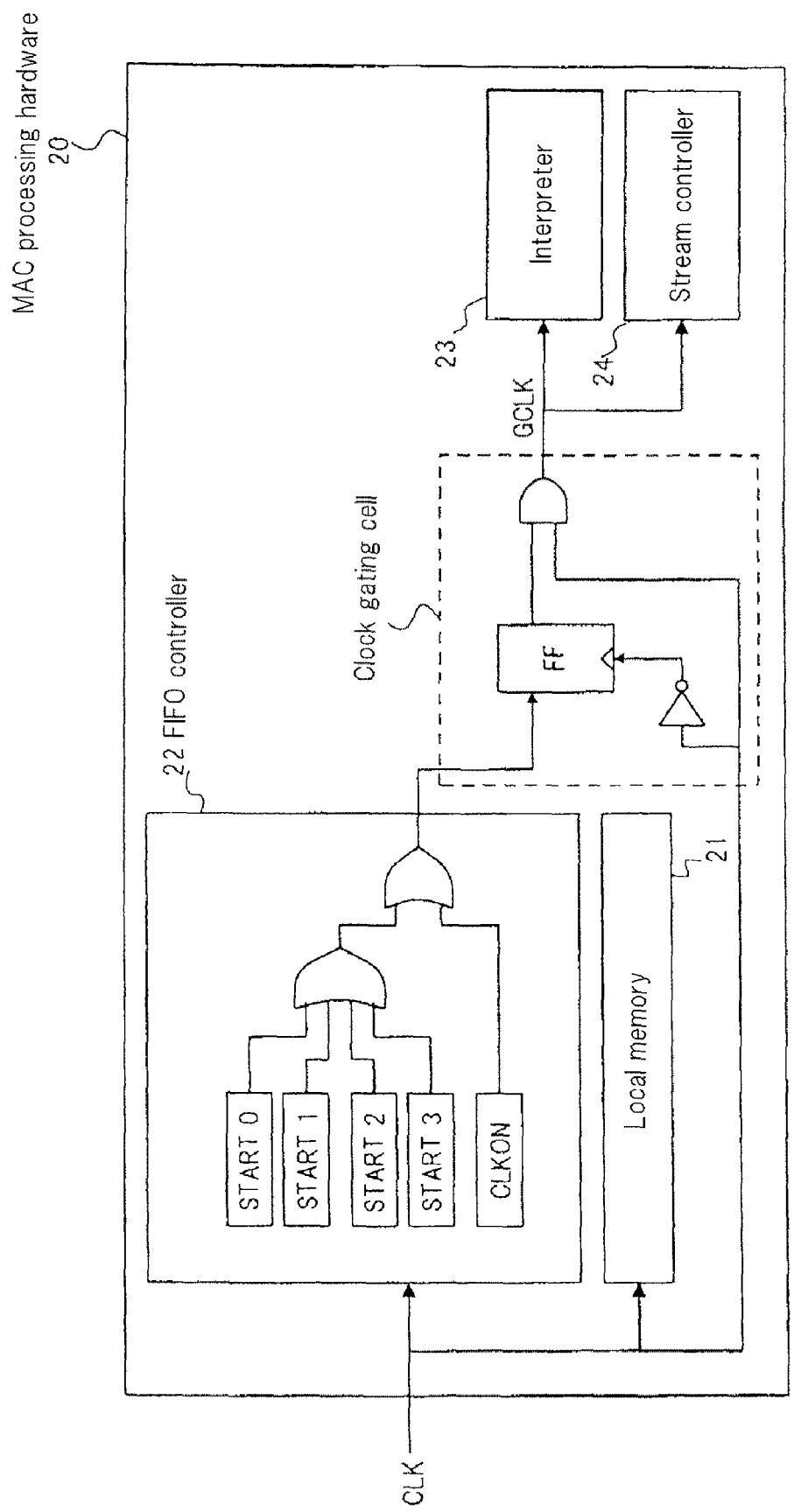
FIG. 15 is a view showing a clock control device in exemplary embodiment 1 of the invention.

FIG. 15 shows a clock control device in MAC processing hardware 20. Internal blocks to which clocks are always supplied from the outside are FIFO controller 22 and local memory 21. To another block a clock is supplied only when at least one processor operates (any one of registers indicating under processing [START] is 1) or when clock forced ON (CLKON) register is 1.

Here, FIG. 15 shows an example in which the number of FIFO processes is 4 (four). In this way, by dynamically controlling the internal operation clocks, it is possible to reduce unnecessary consumption power.

Second Exemplary Embodiment

Figure 16:
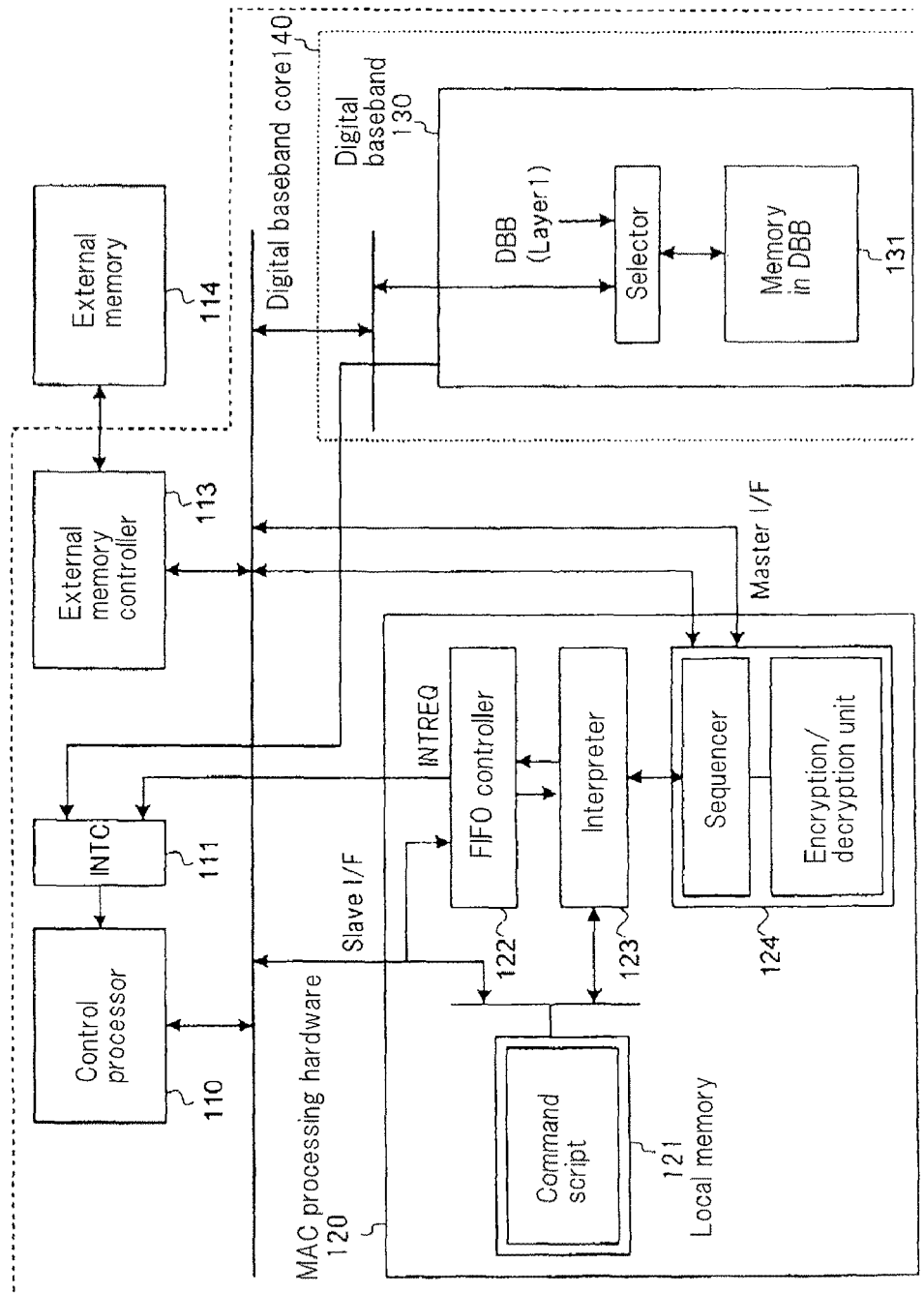
FIG. 16 is a view showing a structure of a data processing apparatus in a second exemplary embodiment of the invention.

FIG. 16 shows a structure of a second exemplary embodiment of the invention. In this exemplary embodiment, MAC processing hardware is mounted as a peripheral block of a control processor and can directly access an external memory.

A data processing LSI for radio communication of this exemplary embodiment assumes a basic structure in which control processor (CPU) 110 performs Layer 2 and Layer 3 processing of a radio communication process, and in which, as a peripheral block of the processor, interrupt controller (INTC) 111, external memory controller 113 and digital baseband (DBB) core 140 that performs Layer 1 processing of a radio communication process exist.

In addition, MAC processing accelerator (MAC HW) 120 is mounted as a peripheral block of the control processor, which is a specific structure of this exemplary embodiment. In addition to control processor 110, MAC processing hardware 120 also can access external memory 114 of the LSI from the outside through external memory controller 113. In other words, MAC processing hardware 120 can serve as the function of DMA controller 12 of the first exemplary embodiment by using the autonomous input/output data transmission function of MAC processing hardware 120.

MAC processing hardware 120 can realize data transmission to external memory 114 from external memory 114 using one or two Master I/F, data transmission into digital baseband core 140 from external memory 114 and data transmission to external memory 114 from digital baseband core 140, for example.

The internal structure of MAC processing hardware 120 is also basically the same as that shown in the first exemplary embodiment. However, when MAC processing hardware 120 is positioned as the second exemplary embodiment, local memory 121 in MAC processing hardware 120 is used only for setting and storing a command script. Thus, it is possible to reduce the size of a memory area for storing the processing data, if necessary.

In addition, when it is not necessary for stream controller 124 performing the data transmission and the encryption/decryption processing to access local memory 121, it is also possible to realize high speed by deleting an access path to local memory 121 from the stream controller, if necessary, or by increasing the number of Master I/F (dividing a bus for reading and a bus for writing), as shown in FIG. 16.

Next, an operation of this exemplary embodiment will be described with reference to FIG. 16.

The internal function and operation of MAC processing hardware 120 are almost the same as those of the first exemplary embodiment. Here, a control method from control processor 120 or an operation sequence of the entire data processing apparatus, which are unique in the second exemplary embodiment, will be described.

First, a case (corresponding to the processing sequence of FIG. 12) will be described of transmitting transmission data that exist on external memory 114 to digital baseband (DBB (Layer 1)) 130 while encrypting the data with MAC processing hardware 120.

(1) Control processor 110 sets, as a command script, information of a command and a parameter for encryption processing in MAC processing hardware 120 and starts MAC processing hardware 120.

(2) MAC processing hardware 120 reads out the transmission data from external memory 114 through Master I/F, performs encryption processing, and header addition processing, if necessary, and writes the result thereof into memory 131 in DBB through Master I/F. When the encryption processing ends, MAC processing hardware 120 interrupts control processor 110.

(3) Control processor (CPU) 110 additionally adds header information and the like to the encrypted transmission data transmitted to memory 131 in DBB, if necessary, and notifies the DBB (Layer 1) block that the transmission has ended.

Next, a case (corresponding to the processing sequence of FIG. 13) will be described of transmitting reception data in the DBB (Layer 1) block to external memory 14 while encrypting the data with MAC processing hardware 120.

(1) Reception data that has been decoded by a reception processing core of the DBB (Layer 1) block is stored in memory 31 in DBB. When the storing ends, an interrupt is generated for control processor 110.

(2) When control processor 110 is started by the interrupt, control processor 110 accesses memory 131 in DBB and interprets a header of the reception data.

(3) Control processor 110 sets, as a command script, parameter information resulting from the header interpretation in MAC processing hardware 120 and starts MAC processing hardware 120.

(4) MAC processing hardware 120 reads out the reception data from memory 131 in DBB through Master I/F, performs decryption processing, and header deletion processing, if necessary, and writes the result thereof into external memory 114 through Master I/F. When the transmission ends, MAC processing hardware 120 interrupts control processor 110.

In addition, a case (corresponding to the processing sequence of FIG. 14) will be described of encrypting or decrypting transmission/reception data existing in external memory 114 with MAC processing hardware 120 and again transmitting the data to external memory 114.

(1) Control processor 110 sets, as a command script, parameter information for encryption/decryption processing in MAC processing hardware 120 and starts MAC processing hardware 120.

(2) MAC processing hardware 120 reads out processing source data from external memory 114 through Master I/F, performs the set description/decryption processing, and again writes the result thereof into external memory 114 through Master I/F. When the encryption/decryption processing ends, MAC processing hardware 120 interrupts control processor 110.

In this way, when MAC processing hardware 120 is mounted as the second exemplary embodiment shown in FIG. 16, MAC processing hardware 120 can realize the function corresponding to DMA controller 12. Thus, it is possible to execute the processing sequence equivalent to the first exemplary embodiment (exemplary embodiment 1) in a processing order that is smaller than that of the first exemplary embodiment (exemplary embodiment 1).

As described above, in the exemplary embodiments of the invention, the calculation of the relatively complicated MAC processing parameters (encryption/decryption parameters, the number of bits of header and data parts and the like) is performed with software processing by a high speed and high functional control processor and only MAC data processing (bit shift processing for addition/deletion of the header part or encryption/decryption processing, data transmission processing and the like), which is relatively regular and suitable for realization by the hardware, is accelerated by the dedicated hardware (MAC processing hardware having the data transmission function: hereinafter, referred to as "MAC processing hardware").

The MAC processing hardware can autonomously perform the input/output of the processing data, the bit shift processing/swap processing and the encryption/decryption processing in accordance with commands from the control processor. By pipeline processing the input of data before processing, encryption/decryption processing and the output of data after processing, the input/output time of the data is covered up and the high speed is realized. In addition, the data input circuit and the data output circuit, which are realized by the hardware, have the bit shift function of data and the bit/byte swap function, and realize any bit processing without cycle overhead of the data input cycle and the data output cycle.

The command from the control processor uses a command script capable of scripting and setting a series of command sequences so as to cope with various MAC data processing such as ((header part transmission processing+data part encryption processing)×(the number of data units). In addition, the interpreter unit, which interprets the script and sequentially operates the encryption/decryption processing circuit units, is provided in the MAC processing hardware. The interpreter unit is realized by a simple processor or hardware such as DSP of function limited edition, for example.

Regarding the various MAC processing of the transmission/reception data stream, the MAC processing hardware has a device capable of inputting a plurality of processing processes to the control unit so that a plurality of MAC data processing can be inputted without making the control processor wait, and realizes the FIFO (First In First Out) for each processing process inputted.

The control processor performs only the calculation of the MAC processing parameters and the MAC processing hardware accelerates the MAC data processing, so that the MAC processing speed can be increased. In particular, the MAC processing hardware has a device that is capable of autonomously inputting/outputting the processing data and performs the pipeline processing therein, so that it is not necessary to transmit the data with the control processor and the input/output time of the data can be covered up. In addition, the input/output processing of the data is realized by the hardware, rather than the processor in the MAC processing hardware, so that it is possible to perform bit processing (shift, swap and the like) of the input/output data without the cycle overhead.

The MAC processing hardware uses the control method which uses command scripts, so that it can autonomously program-process the various data encryption/decryption sequence including the addition/deletion of the header part. As a result, the processing load of the control processor controlling the MAC processing hardware is decreased. In addition, the MAC processing hardware has a FIFO control device for processing a plurality of processes, so that the control processor does not have to wait for the completion of each process and can input a plurality of encryption/decryption sequences (processes) at one time.

Since the MAC processing hardware is specialized only for the MAC data processing that has relatively high regularity and is suitable for realization by hardware, it can be realized by relatively simple hardware without a complicated high speed circuit for calculation or arithmetic operation of various parameters. In addition, the interpretation processing (interpreter) of the command scripts is realized by a simple processor, so that it is possible to easily add or change the commands.

Each of the above exemplary embodiments has the followings effects.

A first effect is to reduce the processing load in MAC processing of the control processor. In particular, it is possible to highly reduce the processing load in the MAC data processing in which the throughput thereof is proportional to the data rates.

The reason is as follows: in each exemplary embodiment, the control processor performs only the processing that is suitable for software processing in MAC processing, such as calculation of the MAC processing parameters, generation of command scripts based on the parameters and the like, and all data transmission processing between the memories, encryption/decryption processing, bit shift processing and the swap processing, which are not suitable for software processing, are accelerated by the MAC processing hardware.

In addition, by using the command scripts, one data stream part can be processed by one command script and the plurality of data streams can be continuously processed. Accordingly, it is possible to reduce the interrupt overhead at minute completion timings of each data unit.

Further, according to the second exemplary embodiment, the MAC processing hardware is positioned as peripheral blocks of the control processor, so that it is possible to reduce the number of times of settings of the DMA controller or the number of receptions of the interrupt signal. Accordingly, it is possible to further reduce the processing load, as compared to the first exemplary embodiment.

A second effect is to increase the processing speed in MAC data processing.

The reason is as follows: in this exemplary embodiment, the MAC data processing is accelerated by the dedicated MAC processing hardware that has been installed, and regarding the processing method therein, as shown in FIG. 9, the input transmission processing of data before processing, encryption/decryption processing and output transmission processing of result data are pipeline-processed for every encryption/decryption processing unit (for example, 64 bits), so that the data input/output cycle (transmission time) is covered up.

In addition, the data input controller for inputting data before processing and the data output controller for outputting the result data are realized by the dedicated hardware, so that it is possible to realize high data transmission performance as in a DMA controller (DMAC).

Further, a variety of bit processing (bit shift, swap and the like) is required so as to adjust the leading bit position of the bit stream with respect to the memory address boundary and to adjust the bit format with the input/output memories, which are characteristics of MAC data processing. However, the bit processing is realized by the setting register and the combination circuit in the data input controller and the data output controller, so that it is possible to realize some bit processing without having cycle overhead during the transmission of the input/output data.

A third effect is to optimize the processing from viewpoints of the area, the consumption power and the performance, in the MAC processing.

The reason is as follows: according to the invention, only MAC data processing, which is relatively regular and suitable for realization by hardware such as data encryption/decryption processing, data transmission processing and various bit processing, is accelerated by hardware, so that it is possible to efficiently improve the performance by adding the minimum necessary circuits.

In addition, when calculation of the relatively complicated MAC processing parameters is performed by hardware, high speed and high functional hardware is required. However, according to the invention, calculation of the MAC processing parameters is performed by software processing of the control processor, so that it is possible to specialize and thus to easily structure the MAC processing hardware for regular processing and to operate it with a low speed clock frequency that satisfies the required performance.

Thus, it is possible to highly improve the performance with simple hardware having a relatively small area and to realize low power consumption in the entire MAC processing.

In addition, since the interpreter and the stream controller occupying most of the structure of the MAC processing hardware are provided with a clock gating device that stops the clock when a process is not processed, it is possible to further lower power consumption in the MAC processing hardware.

A fourth effect is that the MAC processing hardware can cope with the MAC data processing of various combinations.

The reason is as follows: according to the exemplary embodiments, the command script, which is a kind of control program suitable for the MAC processing, is used as the control method of the MAC processing hardware, and the interpreter in the MAC processing hardware can interpret the command.

To be more specific, the command script is structured by a combination of various commands and parameters accompanying the commands, so that it is possible to arbitrarily set the content of MAC data processing (selection of a memory of a source to be read and a destination to be written, a leading address and a leading bit position of the data, bit format of a memory, bit length of data to be processed, various encryption/decryption processing parameters and the like) and to perform the various kinds of encryption/decryption processing in accordance with the parameters by the execution commands.

In addition, the commands can be continuously described by the scripting, so that it is possible to cope with the various kinds of bit stream processing in which a plurality of data units having different bit lengths or parameters is included. Further, it is possible to cope with the processing of encrypting/decrypting the data part while transmitting/adding/deleting the header part by combining with a command only for transmitting the data for which the encryption/decryption processing is not performed (it is optimized for MAC processing).

Furthermore, although the command script is interpreted by the interpreter in the MAC processing hardware, the processing content is a simple processing for setting a variety of accompanying parameters in the stream controller or for starting the stream controller in accordance with the commands that are sequentially read. Thus, it is possible to easily realize the interpreter by installing a simple processor or hardware.

When the interpreter is realized by a simple processor, it is possible to easily cope with the addition and change of the command for coping with the various kinds of MAC data processing.

According to the invention structured as described above, the control processor performs only processing that is suitable for software processing, such as calculation of the MAC processing parameters in MAC processing, generation of command scripts based on the parameters and the like, and all of the MAC data processing that is not suitable for software processing, such as data transmission processing between the memories, encryption/decryption processing, bit shift processing, swap processing and the like, can be accelerated by the MAC processing hardware. Thus, it is possible to reduce the processing load of the control processor in MAC processing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims the priority of Japanese Patent Application No. 2007-175072 filed on Jul. 3, 2007, the disclosures of which are incorporated herein by reference.

The invention claimed is:

1. A data processing apparatus performing a communication process including data encryption/decryption processing, the apparatus comprising:
   a control processor that performs calculation of a MAC (Medium Access Control) processing parameter; and MAC processing means that performs MAC data processing including data encryption/decryption processing,
   wherein the control processor controls the MAC processing means by a command script continuously describing a combination of a command and parameter accompanying it,
   wherein the MAC processing means comprises:
   data input means that autonomously reads out and transmits data to be processed from a memory for every encryption/decryption processing unit;
   data encryption/decryption processing means that performs encryption/decryption processing of the data for every encryption/decryption processing unit;
   data output means that autonomously writes and transmits the resulting data encrypted/decrypted to the memory for every encryption/decryption processing unit; and
   a sequencer that performs pipeline processing for the data input means, the encryption/decryption processing means and the data output means.

2. The data processing apparatus as claimed in claim 1, wherein the data input means and the data output means are provided with bit processing means that performs bit processing by bit shift processing or by swap processing without cycle overhead.

3. The data processing apparatus as claimed in claim 1, wherein the data input means and the data output means are provided with a data storage register that prevents reading or writing access to the same memory address from being performed many times.

4. The data processing apparatus as claimed in claim 1, wherein the MAC processing means has a local memory that stores the command script and MAC processing data, and bus selector means that selects the memory of a source from which the processing data is read out and the memory of a destination to which the resulting data is written from the local memory and a memory at the outside of the MAC processing means in accordance with the parameter in the command script.

5. The data processing apparatus as claimed in claim 1, wherein the MAC processing means has FIFO control means that continuously processes a plurality of processes.

6. The data processing apparatus as claimed in claim 1, wherein the MAC processing means has interpreter means that interprets the command script, and sets a parameter to the sequencer and starts the sequencer in accordance with the interpreted command.

7. The data processing apparatus as claimed in claim 1, wherein the MAC processing means has clock gating means that stops a clock that provides means not required to be executed until a process is inputted.

8. A data encryption/decryption processing method that is performed in a data processing apparatus comprising a control processor that performs calculation of a MAC (Medium Access Control) processing parameter and MAC processing means which comprises data input means, data encryption/decryption processing means, data output means and a sequencer and that performs MAC data processing including data encryption/decryption processing and that performs a communication process including data encryption/decryption processing,
   wherein the control processor controls the MAC processing means by a command script continuously describing a combination of a command and parameter accompanying the command,
   data input means autonomously reads out and transmits data to be processed from a memory for every encryption/decryption processing unit;
   data encryption/decryption processing means performs encryption/decryption processing of the data for every encryption/decryption processing unit;
   data output means autonomously writes and transmits the resulting data encrypted/decrypted to the memory for every encryption/decryption processing unit; and
   a sequencer performs pipeline processing for the data input means, the encryption/decryption processing means and the data output means.

* * * * *